US012414897B2

(12) United States Patent
Hales et al.

(10) Patent No.: US 12,414,897 B2
(45) Date of Patent: Sep. 16, 2025

(54) SYSTEMS AND METHODS FOR A MULTI PATTERN SPA JET

(71) Applicant: BULLFROG INTERNATIONAL, LC, Herriman, UT (US)

(72) Inventors: Eric Hales, Eagle Mountain, UT (US); Christopher Kamerath, Herriman, UT (US); Todd Anderson, Lehi, UT (US); Michael Andersen, American Fork, UT (US)

(73) Assignee: BULLFROG INTERNATIONAL, LC, Herriman, UT (US)

( * ) Notice: Subject to any disclaimer, the term of this patent is extended or adjusted under 35 U.S.C. 154(b) by 385 days.

(21) Appl. No.: 17/984,738

(22) Filed: Nov. 10, 2022

(65) Prior Publication Data

US 2024/0156679 A1 May 16, 2024

(51) Int. Cl.
*A61H 33/00* (2006.01)
*A61H 33/02* (2006.01)

(52) U.S. Cl.
CPC ....... *A61H 33/6021* (2013.01); *A61H 33/027* (2013.01); *A61H 2033/021* (2013.01); *A61H 33/6052* (2013.01)

(58) Field of Classification Search
CPC .. A61H 33/027; A61H 33/6052; A61H 33/02; A61H 33/6021; A61H 33/601; A61H 2033/021; A61H 2033/022; B05B 1/18; B05B 7/0483
USPC ........................................................ 4/541.6
See application file for complete search history.

(56) References Cited

U.S. PATENT DOCUMENTS

| | | | | |
|---|---|---|---|---|
| 4,742,965 A | | 5/1988 | Messinger et al. | |
| 4,800,046 A | * | 1/1989 | Malek ................. | A61H 33/027 417/187 |
| 4,985,943 A | | 1/1991 | Tobias et al. | |
| 5,495,627 A | | 3/1996 | Leaverton et al. | |

(Continued)

FOREIGN PATENT DOCUMENTS

| | | |
|---|---|---|
| JP | 2009072462 A | 4/2009 |
| WO | 1998040042 A1 | 9/1998 |

OTHER PUBLICATIONS

IP Australia, "Examination Report No. 3," for Australian Patent Application No. 2023263568, Mar. 13, 2025.

(Continued)

*Primary Examiner* — Cody J Lieuwen
(74) *Attorney, Agent, or Firm* — Dentons Durham Jones Pinegar; Sarah W. Matthews

(57) ABSTRACT

This disclosure relates generally to jets for spas and, more specifically, to jets that can have more than one jet hydrotherapy spray mode. The jet can include a selectively rotatable jet head, the jet head having a first jet spray mode and a second jet spray mode. The jet head includes a valve, the valve having a first water inlet and a second water inlet, the valve further comprising a first air channel and a second air channel. The valve is rotatable from a first jet spray mode position in which a water intake is in fluid communication with the first water inlet and an air intake is in fluid communication with the first air channel, to a second jet spray mode position in which the water intake is in fluid communication with the second water inlet and the air intake is in fluid communication with the second air channel.

19 Claims, 13 Drawing Sheets

(56) References Cited

U.S. PATENT DOCUMENTS

| | | | | |
|---|---|---|---|---|
| 5,862,543 | A * | 1/1999 | Reynoso ............ | A61H 33/6052 239/394 |
| 5,915,849 | A * | 6/1999 | Dongo ................. | A61H 33/027 4/492 |
| 2010/0065665 | A1* | 3/2010 | Whitaker .................. | B05B 1/18 239/562 |
| 2020/0055065 | A1 | 2/2020 | Lehtonen et al. | |

OTHER PUBLICATIONS

IP Australia "AU Examination Report No. 1," Australia Application No. 2023263568, Oct. 31, 2024.
European Patent Office, "Extended European Search Report," European Application No. 23208067.1, Mar. 15, 2024.

* cited by examiner

SYSTEMS AND METHODS FOR A MULTI PATTERN SPA JET

TECHNICAL FIELD

This disclosure relates generally to spa jets with nozzles, spray heads, or other outlets. More specifically, this disclosure relates to spa jets that can be selectively adjustable between more than one jet spray mode.

SUMMARY

In various aspects, systems and methods are provided for a spa jet with a plurality of spray modes.

According to one aspect, a spa jet has more than one jet spray mode, and includes a selectively rotatable jet head, the selectively rotatable jet head having a first jet spray mode and a second jet spray mode. The selectively rotatable jet head comprises a valve, the valve having a first water inlet and a second water inlet, the valve further comprising a first air channel and a second air channel. The valve is rotatable from a first jet spray mode position in which a water intake is in fluid communication with the first water inlet and an air intake is in fluid communication with the first air channel, and a second jet spray mode position in which the water intake is in fluid communication with the second water inlet and the air intake is in fluid communication with the second air channel.

According to another aspect, the spa jet can also include a face plate in connection with the valve, such that rotation of the face plate rotates the valve. The face plate can include a first nozzle in fluid communication with the first water inlet and the first air channel and a second nozzle in fluid communication with the second water inlet and the second air channel. In some embodiments, the second nozzle comprises a second array of nozzles.

In another embodiment, the valve includes a third water inlet and a third air channel, and the valve is rotatable to a third jet spray mode position in which the water intake is in fluid communication with the third water inlet and the air intake is in fluid communication with the third air channel. The first water inlet can be in fluid communication with a first water channel, the first water channel extending through the valve from the first water inlet to a first water channel outlet. The second water inlet can be in fluid communication with a second water channel, the second water channel extending through the valve from the second water inlet to a second water channel outlet. The third water inlet can be in fluid communication with a third water channel, the third water channel extending through the valve from the third water inlet to a third water channel outlet.

According to another aspect, the spa jet can include a water chamber in connection with the valve, the water chamber comprising: a central portion for receiving a portion of the first water channel outlet; a medial portion in fluid communication with the second water channel outlet; and an outer portion in fluid communication with the third water channel outlet.

According to another aspect, the spa jet can include an air chamber housing in connection with the water chamber, the air chamber housing comprising a central air chamber, a medial air chamber with a second array of apertures, and an outer air chamber with a third array of apertures.

In some embodiments, a portion of the first water channel extends through the central air chamber. The second array of apertures may be in fluid communication the medial portion of the water chamber and the second air channel to allow air and water to mix in the medial air chamber when the valve is in the second jet spray mode position. The third array of apertures can be in fluid communication with the outer portion of the water chamber and the third air channel to allow air and water to mix in the outer air chamber when the valve is in the third jet spray mode position.

According to another aspect, the jet can further comprise a face plate in connection with the air chamber. The face plate can include a first nozzle in fluid communication with the first water channel, an array of second nozzles in fluid communication with the second array of apertures of the medial air chamber, and/or an array of third nozzles in fluid communication with the third array of apertures of the outer air chamber.

In other embodiments, a spa jet with a first hydrotherapy spray setting and a second hydrotherapy spray setting includes: a first water inlet for receiving water, the first water inlet in fluid communication with a first set of nozzles for providing the first hydrotherapy spray setting; a first air inlet for receiving air, the first air inlet in communication with the first set of nozzles for providing the first hydrotherapy spray setting; a second water inlet for receiving water, the second water inlet in fluid communication with second set of nozzles for providing the second hydrotherapy spray setting; and a second air inlet for receiving air, the second air inlet in communication with the second set of nozzles for providing the second hydrotherapy spray setting.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
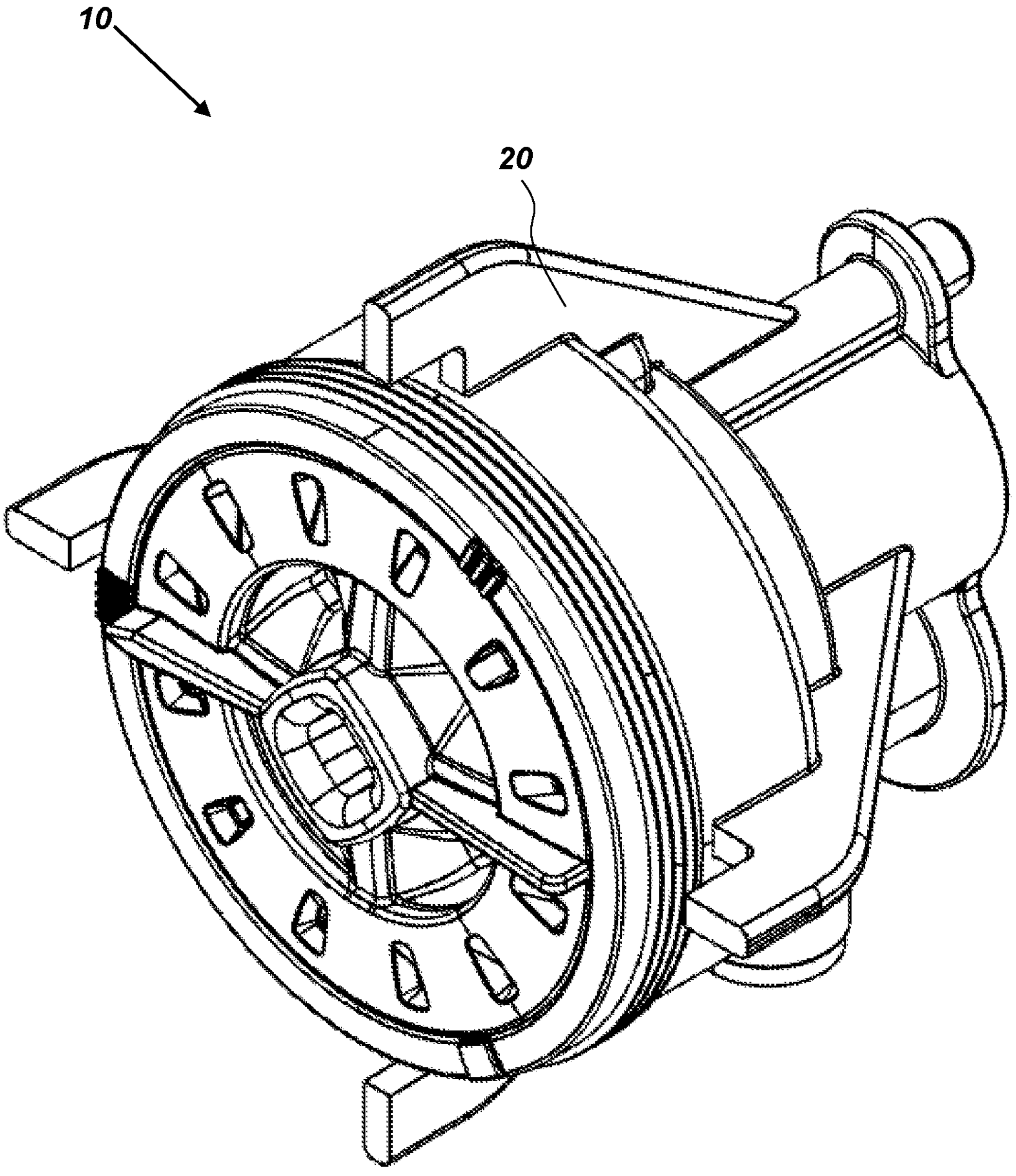
FIG. 1 provides a perspective view of an embodiment of a jet system according to this disclosure.
Figure 2:
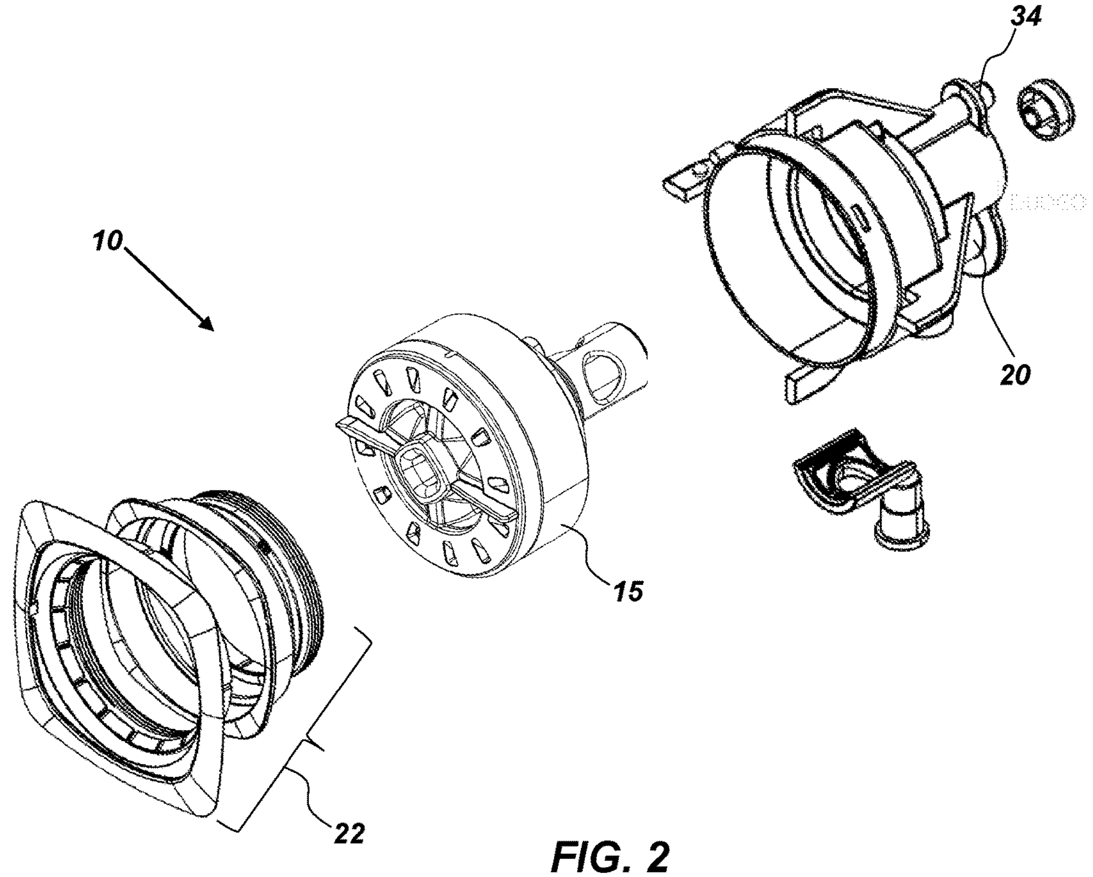
FIG. 2 provides a perspective, exploded view of the embodiment of the jet system shown in FIG. 1.
Figure 3:
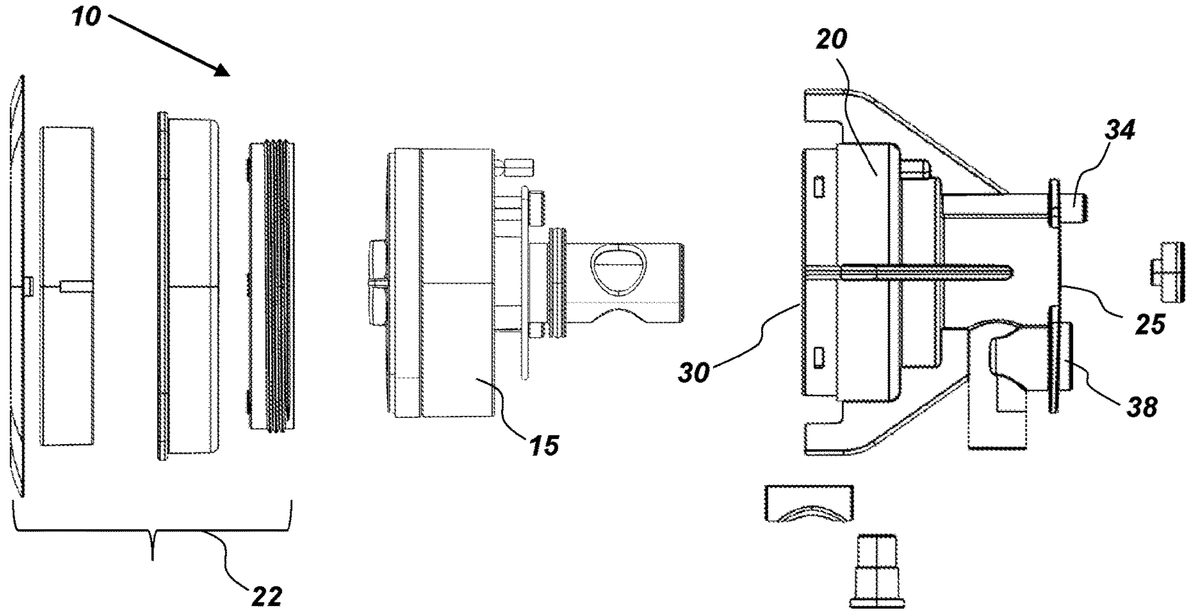
FIG. 3 provides a side, exploded view of the embodiment of the jet system shown in FIG. 1.

FIGS. 1-3 illustrate an embodiment of a jet system or jet assembly 10 having more than one jet spray mode. The jet system 10 includes a housing 20, with a selectively rotatable jet head 15 in rotatable connection with the housing 20. One or more nuts and/or plates 22 may hold the selectively rotatable jet head 15 in rotatable connection with the housing 20.

The housing includes a distal end 25 and a proximal end 30. The housing is typically positioned in a spa shell through a void in the spa shell, or in a selectively removable spa seat back, such that the proximal end 30 is positioned in fluid communication with a spa cavity for water to exit into the spa cavity through the proximal end 30. The distal end 25 of the housing 20 includes an air intake 34 and a water intake 38.

A face plate 40 of the selectively rotatable jet head 15 is positioned at the proximal end 30 of the housing for a user to rotate the jet head 15 when the user is in the spa cavity. The housing 20 can be any suitable shape and dimensions to house the selectively rotatable jet head 15.

Figure 4:
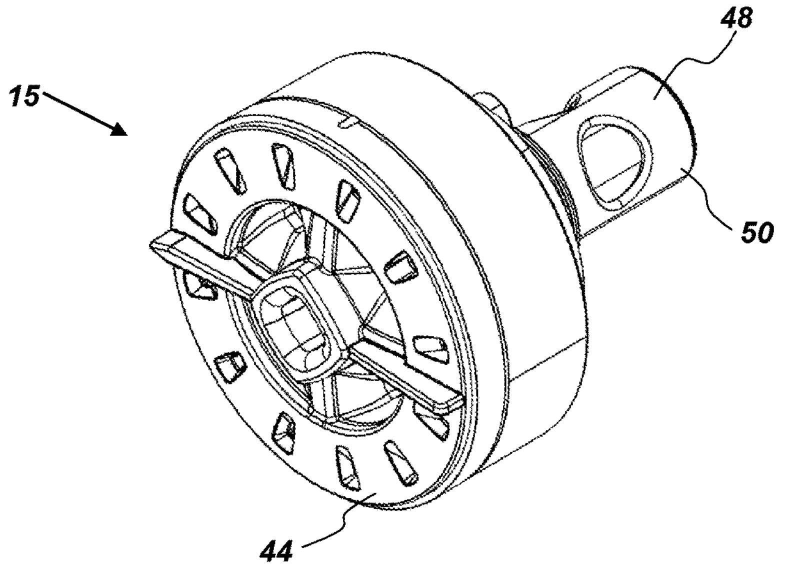
FIG. 4 provides a perspective view of a rotatable jet head used in embodiment of the jet system shown in FIG. 1.
Figure 5:
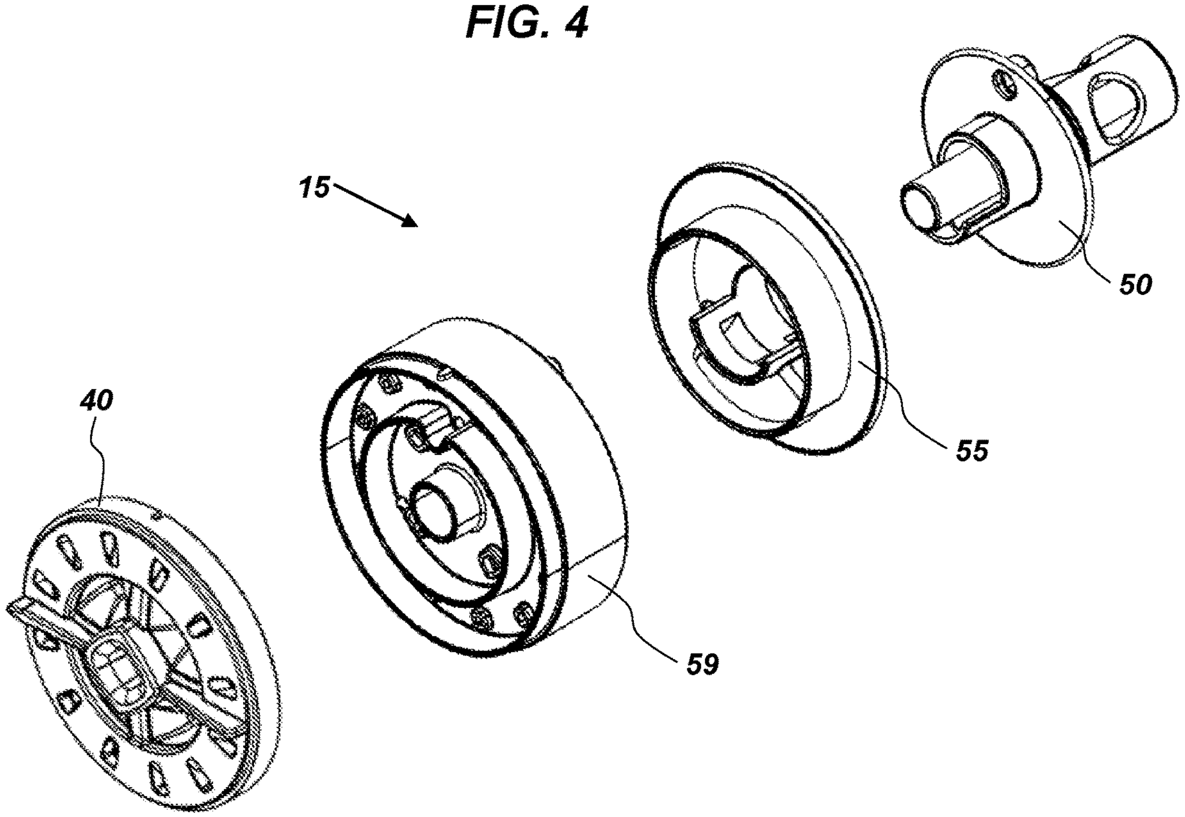
FIG. 5 provides an exploded view of the rotatable jet head shown in FIG. 4.

With reference to FIGS. 4-5, the selectively rotatable jet head 15 includes a proximal end 44 and a distal end 48. One or more water channels and air channels flow through the jet head 15, and the water and air channels are selected for water and air to pass through the jet head, from the distal end 48 to the proximal end 44, as the jet head 15 is rotated within the housing 20. To form the rotatably selectable water and air channels, the jet head 15 includes a valve 50, a water chamber 55, an air chamber housing 59 forming a plurality of air chambers, and the face plate 40. These portions of the jet head 15 are in connection, such that rotation of the face plate 40 at the proximal end 44 of the jet head 15 similarly rotates the air chamber housing 59, water chamber 55, and valve 50. In other embodiments, the water and air chambers can be formed in different configurations.

Figure 6:
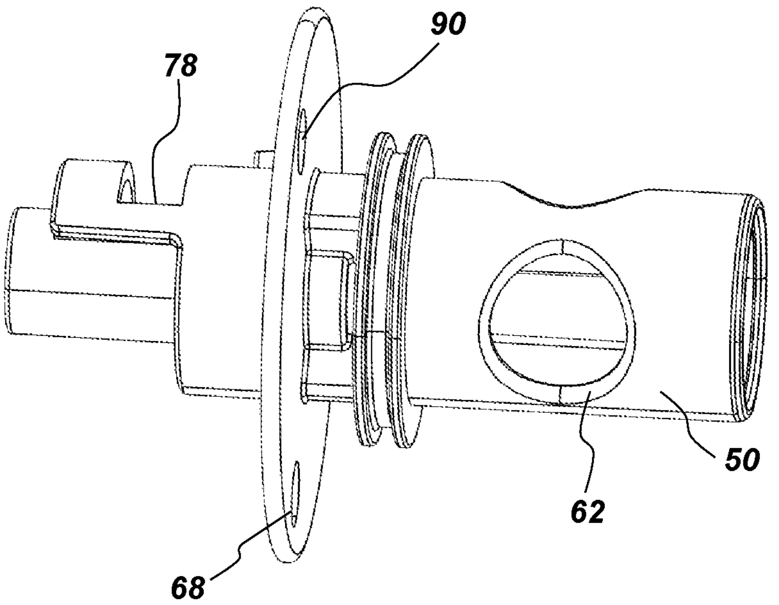
FIG. 6 provides a rear perspective view of a valve used in a jet system.
Figure 7:
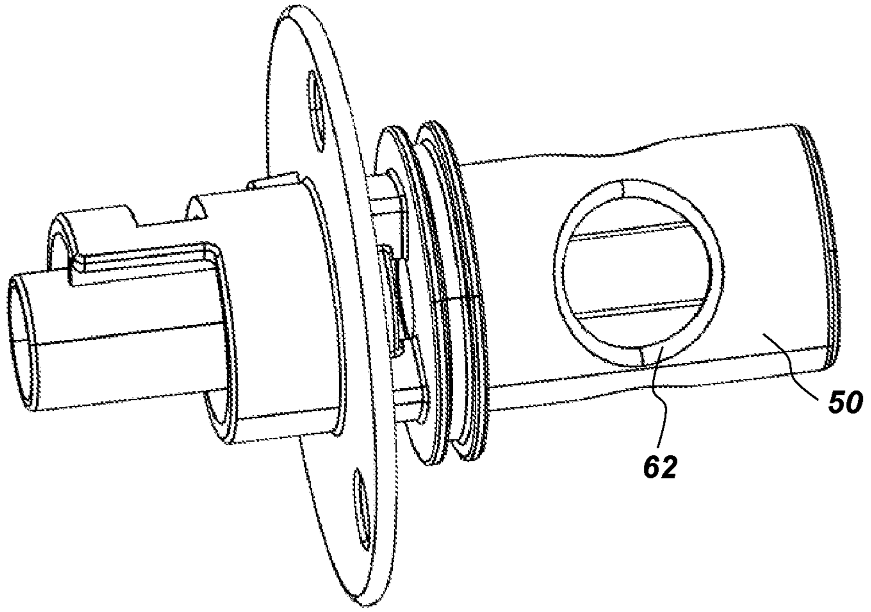
FIG. 7 provides a front perspective view of a valve used in a jet system.
Figure 8:
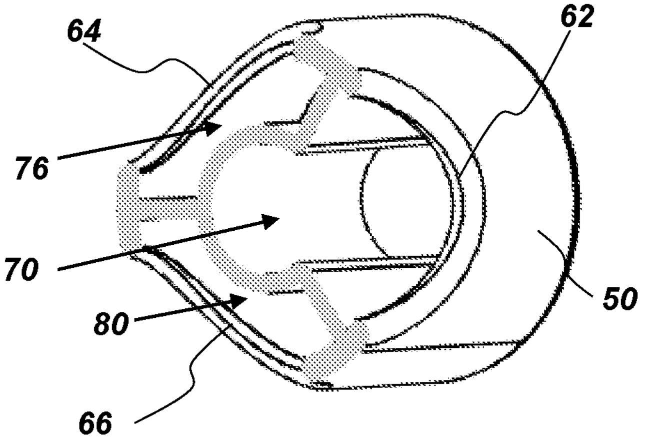
FIG. 8 provides a cross-sectional view of the valve of FIGS. 6-7.
Figure 9:
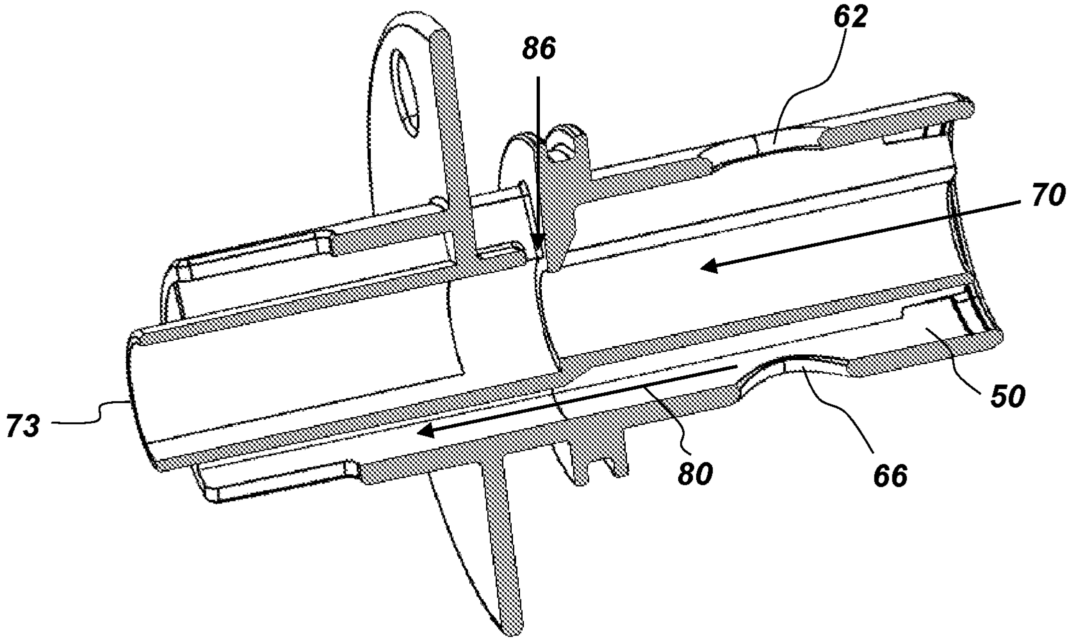
FIG. 9 provides another cross-sectional view of the valve of FIGS. 6-7.

The valve 50 is at a distal end 48 of the jet head, and is in rotatably selective fluid communication with the air intake 34 and water intake 38 of the housing 20, to receive air and water into the valve 50. FIGS. 6-7 show distal and proximal perspective views, respectively, of the valve 50. The valve includes three water inlets, spaced equidistant apart. A first water inlet 62, a second water inlet 64, and a third water inlet 66 allow the valve to be rotated and selectively connect one of the three water inlets to the water intake 38 of the housing 20. As the valve is rotated 120 degrees, a different water inlet comes into fluid communication with the water intake 38 of the housing 20. In other embodiments, the water inlets can be other shapes, sizes, and located in other positions. In other embodiments, more than three water inlets are provided, such as four, five, or more water inlets. Or fewer water inlets, such as two, can be used.

Each water inlet is in fluid communication with a water channel formed in the valve 50. The first water inlet 62 is in fluid communication with a first water channel 70. The first water channel 70 extends through the valve 50, from the first water inlet 62 to a first water channel outlet 73. In the embodiment shown, the first water channel 70 runs substantially through the center of the valve 50, but in other embodiments the first water channel 70 can be in another location along the valve, have other shapes and sizes, etc. The first water channel 70 extends past the second and third water channels, through the water chamber 55, the air chamber housing 59, and is in direct fluid communication with the central nozzle of the face plate 40. The second and third water channels direct water through the water chamber 55 and air chamber housing 59 as described in more detail below. In other embodiments, the first water channel can also pass water through the water chamber 55 and/or air chamber housing 59. The water channels can be arranged and shaped as desired to deliver water through the valve and the through the jet head 15.

The second water inlet 64 is in fluid communication with a second water channel 76 of the valve 50. The second water channel 76 extends through the valve 50, from the second water inlet 64 to a second water channel outlet 78. Similarly, the third water inlet 66 is in fluid communication with a third water channel 80. The third water channel 80 extends through the valve 50, from the third water inlet 66 to a third water channel outlet 82.

The valve 50 can also include one or more air channels to selectively deliver air to different portions of the valve 50. The valve 50 in the embodiment shown includes three air channels. A first air channel 86, a second air channel 88, and a third air channel 90, allow the valve to be rotated and selectively fluidly couple one of the three air channels to the air intake 34 of the housing 20. As the valve is rotated 120 degrees, a different air channel comes into fluid communication with the air intake 34 of the housing 20. In other embodiments, the air channels can be other shapes, sizes, and positions. In other embodiments, more than three air channels are provided, such as four, five, or more air channels Or fewer air channels, such as two, can be used. In some embodiments the number of air channels is equal to the number of water channels and the number of modes available for the jet system 10.

When the jet head 15 is rotated into the first jet spray mode position, the water intake 38 of the housing 20 is in fluid communication with the first water inlet 62, and the air intake 34 of the housing 20 is in fluid communication with the first air channel 86. As the jet head is rotated 120 degrees into a second jet spray mode position, the water intake 38 of the housing 20 is in fluid communication with the second water inlet 64, and the air intake 34 of the housing 20 is in fluid communication with the second air channel 88. As the jet head is rotated yet another 120 degrees into a third jet spray mode position, the water intake 38 of the housing 20 is in fluid communication with the third water inlet 66, and the air intake 34 of the housing is in fluid communication with the third air channel 90.

Figure 10:
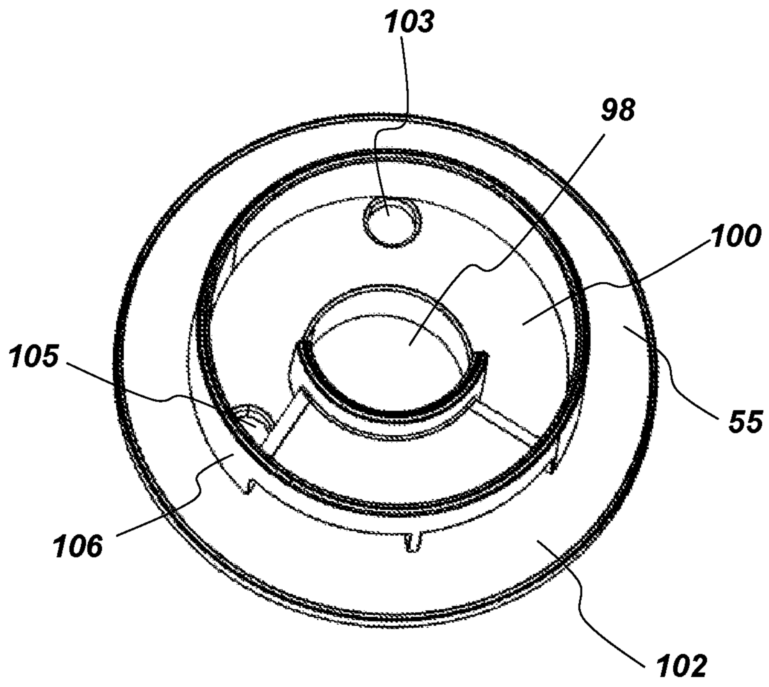
FIG. 10 provides a front perspective view of a water chamber used in a jet system.
Figure 11:
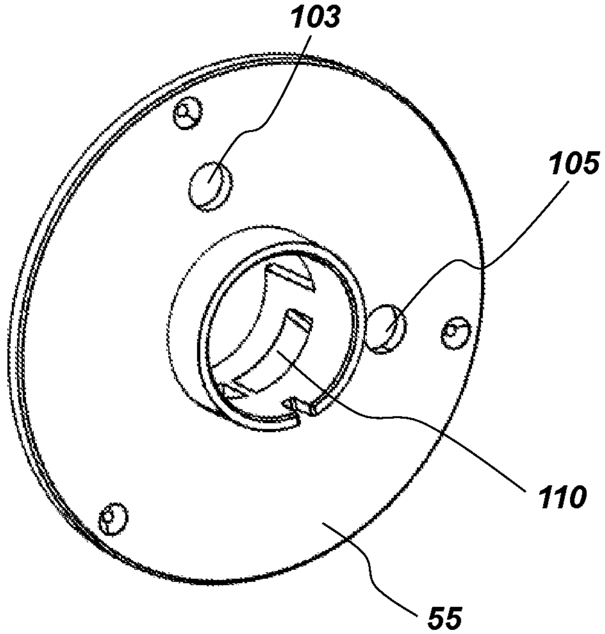
FIG. 11 provides a rear perspective view of the water chamber shown in FIG. 10.

After water passes through the valve 50, it is directed to a water chamber 55. FIGS. 10-11 show perspective front and rear views, respectively, of the water chamber 55. Water chamber 55 includes three portions to separate the water flows from the first water channel 70, the second water channel outlet 78, and the third water channel outlet 82. The water chamber 55 includes a central portion 98 to allow a portion of the first water channel 70 to pass through the water chamber, a medial portion 100 in fluid communication with the second water channel outlet 78, and an outer portion 102 in fluid communication with the third water channel outlet 82.

The central portion 98 of the water chamber 55 can be an aperture to receive a portion of the first water channel 70 therethrough. The first water channel 70 can pass through the aperture in the central portion 98 of the water chamber 55, to deliver water to the face plate 40 as discussed in more detail below.

The medial portion 100 of the water chamber 55 is in fluid communication with the second water channel outlet 78, to direct water from the second water channel outlet 78 into the medial portion 100 of the water chamber 55. A divider 106 can be provided to divide the medial portion 100 of the water chamber 55 from the outer portion 102 of the water chamber 55. The outer portion 102 of the water chamber 55 is in fluid communication with the third water channel outlet 82, to direct water from the third water channel outlet 82 into the outer portion 102 of the water chamber 55. An aperture 110 in the central portion 98 of the water chamber 55 can allow water to pass from the third water channel outlet 82 into the outer portion 102 of the water chamber 55. The water chamber 55 can also include one or more apertures 103, 105, to allow the first and second air channels to pass through the water chamber 55.

After water passes through the water chamber 55, it flows into the air chamber housing 59. Air chamber housing includes a plurality of apertures to allow water to flow into the air chamber housing 59 from the water chamber 55. Or, in the case of the first water channel 70, it can pass directly through a first, center aperture of the water chamber 55.

To provide a comfortable hydrotherapy experience, spa jets combine both water and air to create the desired hydrotherapy effects. To provide air to the correct portion of the jet, one or more air channels may also be provided. An air channel can allow air to mix with the water, so a combination of air and water exit the nozzles through the face plate 40. This combination of air and water can be desirable to achieve various hydrotherapy effects. The air chamber housing 59 forms separate air chambers to allow air and water to mix. The air chamber housing 59 is in connection with the water chamber 55 and the face plate 40, such that rotating the face plate 40 causes the air chamber housing 59 to similarly rotate.

Figure 12:
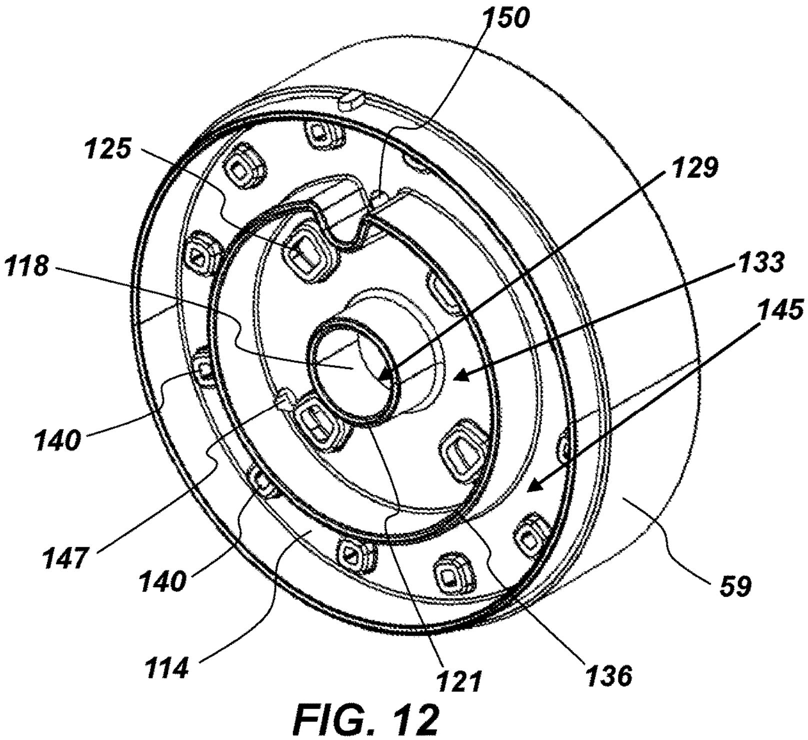
FIG. 12 provides a front perspective view of an air chamber housing used in a jet system.
Figure 13:
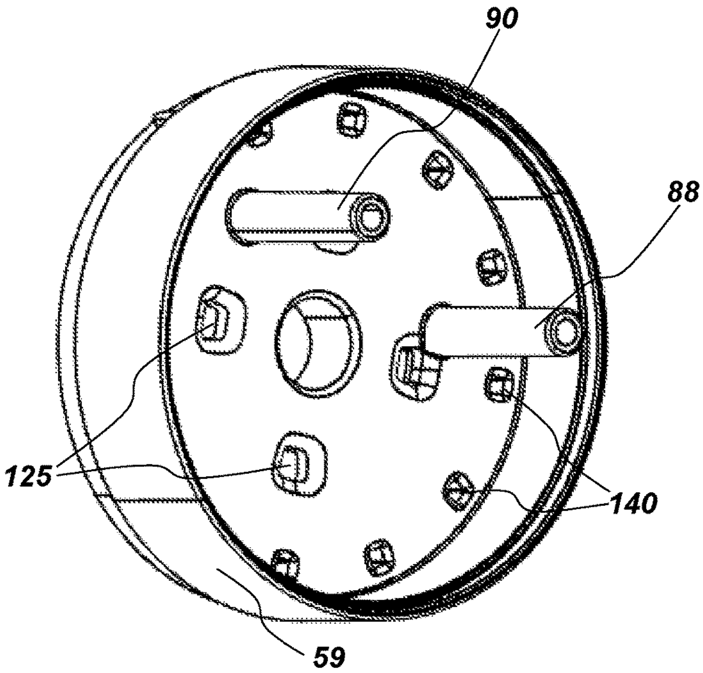
FIG. 13 provides a rear perspective view of the air chamber housing shown in FIG. 12.
Figure 14:
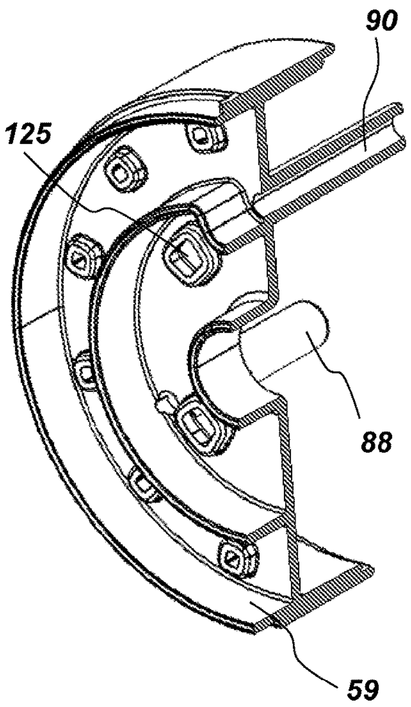
FIG. 14 provides a cross-sectional view of the air chamber housing shown in FIGS. 12-13.

With reference to FIGS. 12-14, the proximal face 114 of the air chamber housing 59 includes a first, center aperture 118. This center aperture 118 can allow the first water channel 70 to pass through the air chamber housing 59 and be in direct fluid communication with the face plate 40. In other embodiments, the proximal face 114 includes a fitting to receive water from the first water channel 70 and pass water from the first water channel 70 through the air chamber housing 59 to the face plate 40.

The proximal face 114 of the air chamber housing 59 can also include one or more dividers to separate the proximal face 114 of the air chamber housing 59 into individual air chambers. For example, a first divider 121 can separate first, center aperture 118 from a second array of apertures 125 and form a central air chamber 129 and a medial air chamber 133. A second divider 136 can separate the second array of apertures 125 from a third array of apertures 140 and form an outer air chamber 145.

The medial air chamber 133 receives water from the water chamber through the second array of apertures 125. The medial air chamber 133 receives air from the second air channel through second air channel outlet 147, which is an aperture in the medial air chamber in fluid communication with the second air channel 88. When the valve 50 is in the second jet spray mode position, the second air channel 88 is in fluid communication with the air intake 34, allowing air to pass from the air intake 34, through the second air channel 88, through second air channel outlet 147, and into the medial air chamber 133. Water and air mix in the medial air chamber 133 and exit through the nozzles on the face plate 40 as discussed below.

The outer air chamber 145 receives water from the water chamber 55 through the third array of apertures 140. The outer air chamber 145 receives air from the third air channel through third air channel outlet 150, which is an aperture in the outer air chamber 145 in fluid communication with the third air channel. When the valve 50 is in the third jet spray mode position, the third air channel 90 is in fluid communication with the air intake 34, allowing air to pass from the air intake 34, through the third air channel 90, through third air channel outlet 150, and into the outer air chamber 145. Water and air mix in the outer air chamber 145 and exit through the nozzles on the face plate 40 as discussed below.

The face plate 40 is connected to the air chamber housing 59, and rotation of the face plate 40 similarly rotates the air chamber housing 59, water chamber 55, and valve 50. The face plate includes a plurality of nozzles to allow the water and air mixture to exit the jet head 15. The plurality of nozzles can generally align with the chambers formed in the air chamber housing, and in some embodiments, the plurality of nozzles can also generally align with the apertures in the air chamber housing 59. In other embodiments, the nozzles of the face plate 40 do not align with the apertures in the air chamber housing 59.

Figure 15:
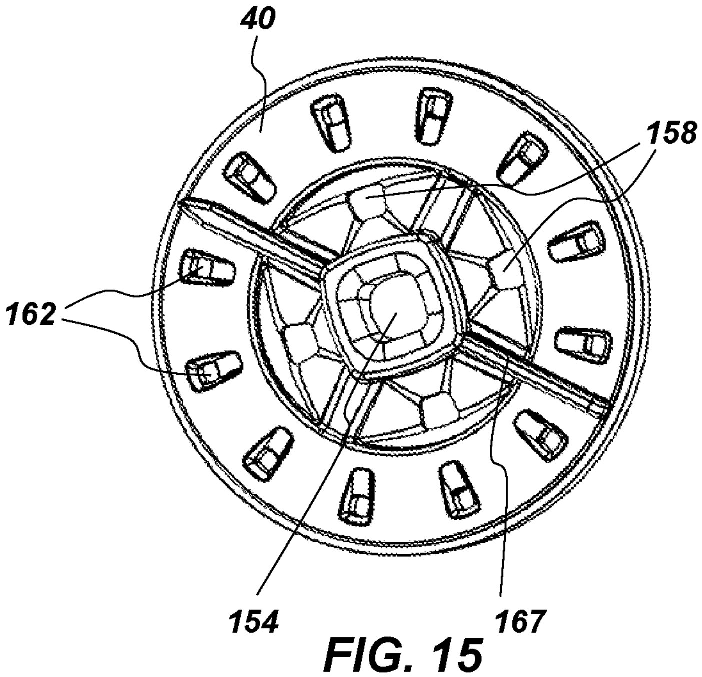
FIG. 15 provides a front perspective view of a face plate used in a jet system.
Figure 16:
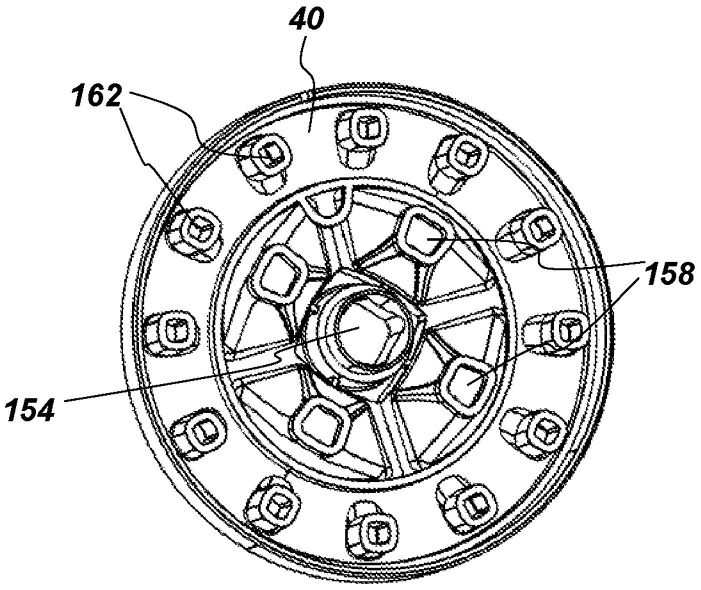
FIG. 16 provides a rear perspective view of the face plate of FIG. 15.

In the specific embodiment shown in FIGS. 15-16, the face plate 40 includes a first nozzle 154 in fluid communication with the first, center aperture 118 of the central air chamber. A second array of nozzles 158 are in fluid communication with the second array of apertures 125 of the medial air chamber 133. A third array of nozzles 162 are in fluid communication with the third array of apertures 140 of the outer air chamber 145. In other embodiments, nozzles can be in different placement, nozzles can be different shapes and sizes, and/or there may be more or fewer nozzles as desired. The number, size, shape, and placement of nozzles can be optimized based on the desired hydrotherapy effects of the jet head 15. Depending on the desired hydrotherapy characteristics for each jet spray mode of the jet system 10, the apertures and nozzles may be raised protrusions with an outlet in the middle, apertures formed through the face plate 40, or the like.

The face plate 40 can also include one or more structures to allow the face plate 40 (and corresponding jet head 15) to be easily rotated and aligned within the housing. For example, a projection 167 can extend from the face plate that can be gripped and rotated by a user.

Figure 17:
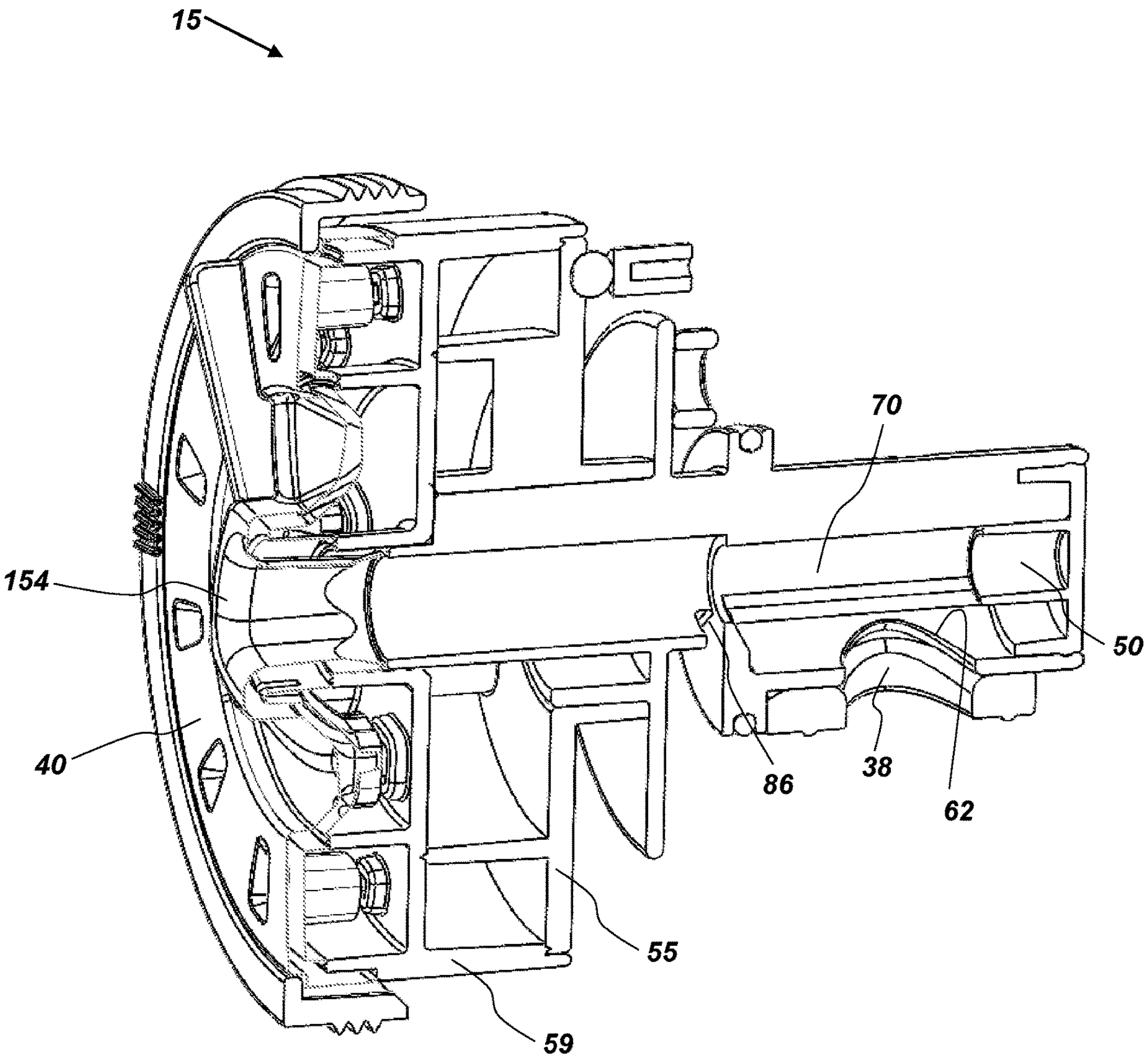
FIG. 17 provides a cross-sectional view of a jet system shown in a first jet spray mode position with the housing removed for clarity.

In operation, the jet system 10 allows a user to select from multiple different hydrotherapy or jet spray modes. The fluid path of the water and the fluid path of the air through the selectively rotatable jet head 15 depends on the alignment of the jet head 15 with the air intake 34 and the water intake 38. A user may first select their desired jet spray mode. For example, a user can first select the first jet spray mode. The user rotates jet head 15 until the first water inlet 62 of the valve 50 aligns with the water intake 38, as seen in FIG. 17, and the first air channel 86 is in fluid communication with the air intake 34. This allows water to pass through the first water channel 70, with air entering the first water channel through the first air channel 86. The mixed water and air can exit the first nozzle 154 of the face plate 40 to provide a first jet spray mode hydrotherapy to the user. This first jet spray mode hydrotherapy can be a single, fairly strong jet of water.

Figure 18:
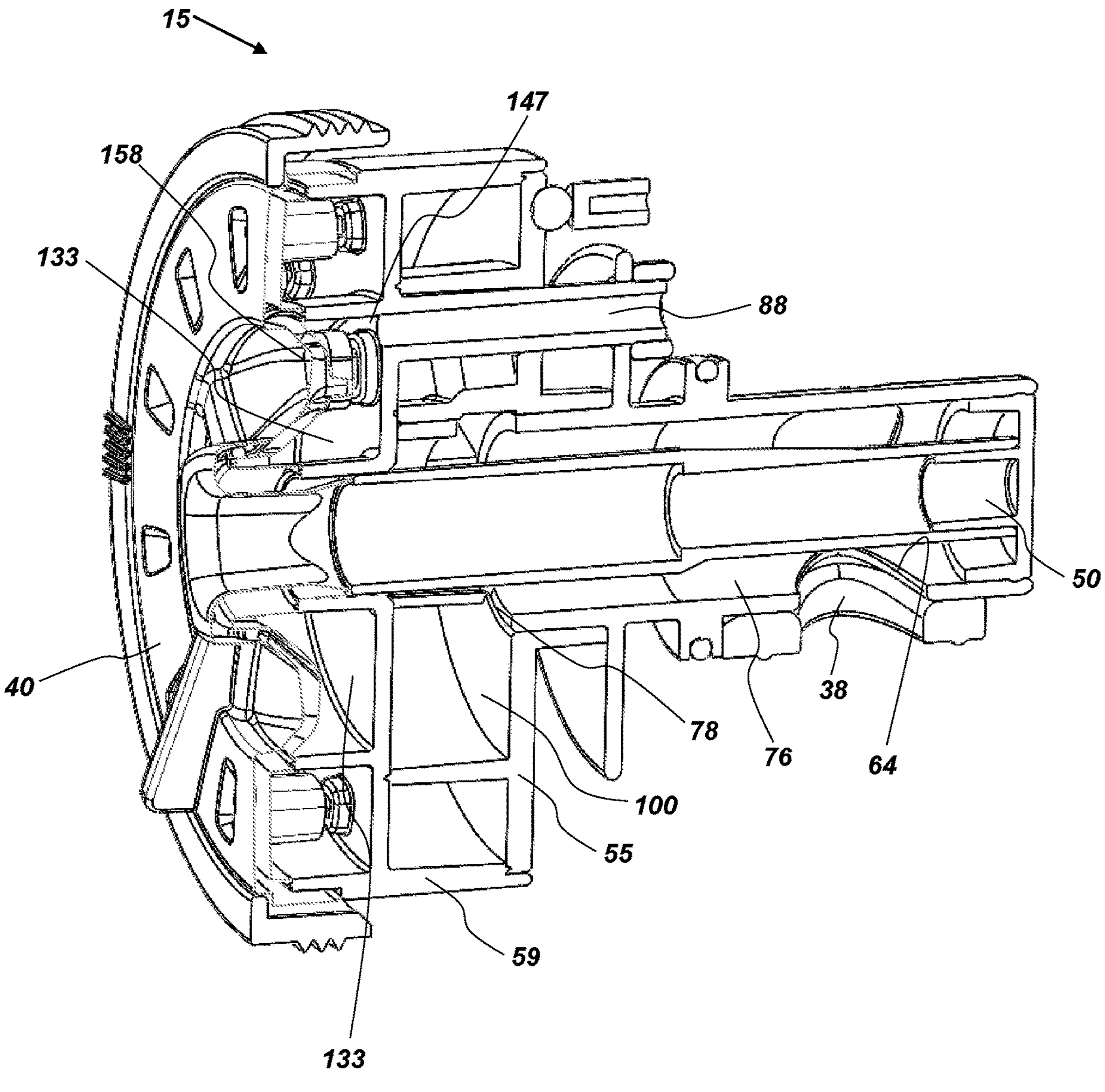
FIG. 18 provides a cross-sectional view of a jet system shown in a second jet spray mode position with the housing removed for clarity.

If the user desires a second jet spray mode, the user can rotate the jet head 15 (for example, the user can grasp projection 167 to rotate the face plate 40 and correspondingly rotate the jet head 15) one-hundred twenty degrees, until the second water inlet 64 of the valve 50 aligns with the water intake 38, as seen in FIG. 18, and the second air channel 88 is in fluid communication with the air intake 34. This allows water to pass through the second water channel 76, out the second water channel outlet 78 to the water chamber 55, and into the medial portion 100 of the water chamber 55. The water passes from the medial portion 100 of the water chamber 55 to the medial air chamber 133 of the air chamber housing 59 through the second array of apertures 125 (not visible in FIG. 18). In the medial air chamber 133, the water mixes with air. Air is received into the medial air chamber 133 from the air intake 34, through the second air channel 88, through second air channel outlet 147, and into the medial air chamber 133. The mixed water and air can exit from the second array of nozzles 158 of the face plate 40 to provide a second jet spray mode hydrotherapy to the user. This second jet spray mode hydrotherapy can include more streams of water compared to the first jet spray mode, with each stream of water having a relatively smaller force compared to the single stream provided by the first jet spray mode.

Figure 19:
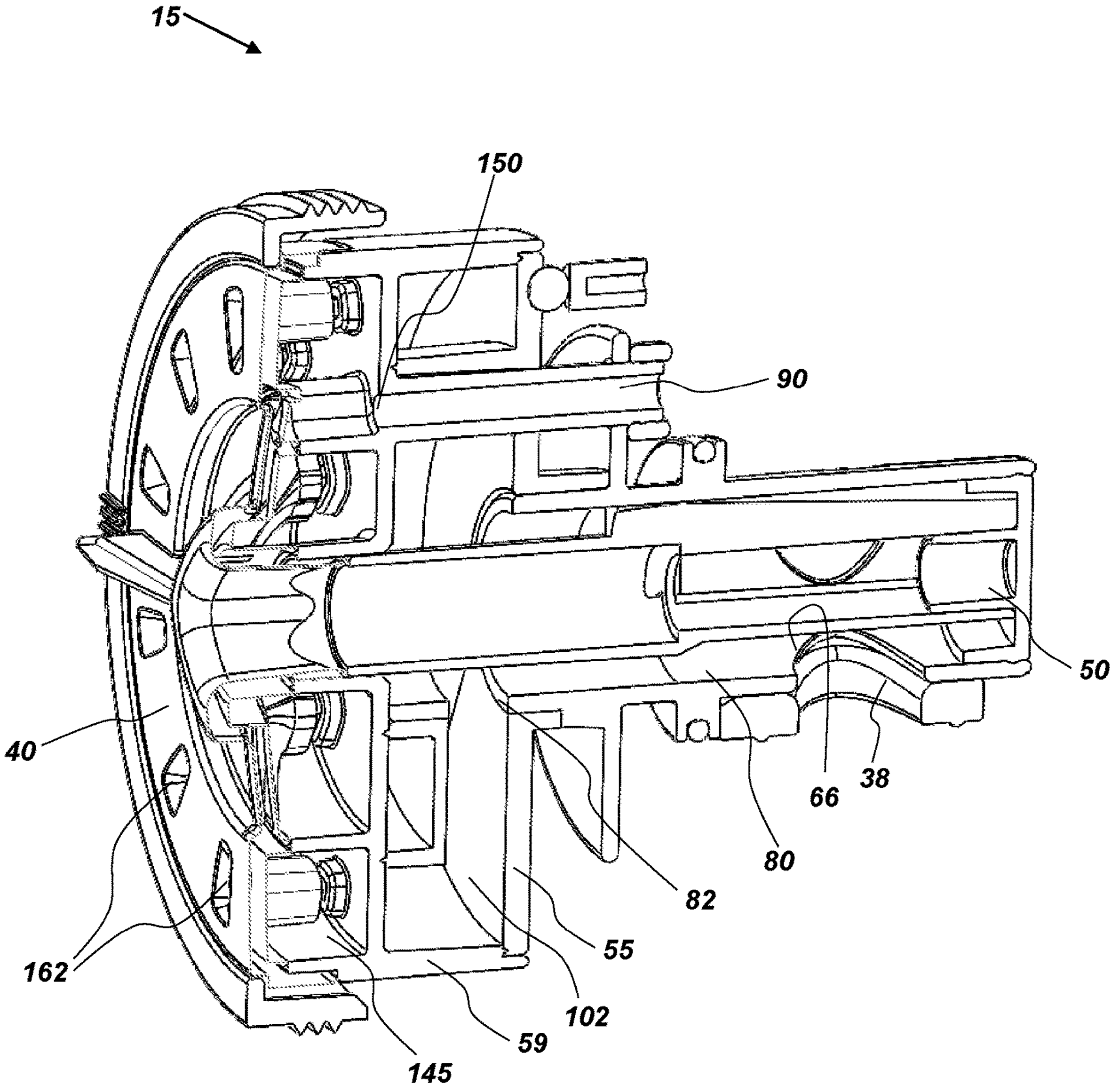
FIG. 19 provides a cross-sectional view of a jet system shown in a third jet spray mode position with the housing removed for clarity.

If the user desires a third jet spray mode, the user can rotate the jet head 15 (for example, the user can grasp projection 167 to rotate the face plate 40 and correspondingly rotate the jet head 15) one-hundred twenty degrees, until the third water inlet 66 of the valve 50 aligns with the water intake 38, as seen in FIG. 19, and the third air channel 90 is in fluid communication with the air intake 34. This allows water to pass through the third water channel 80, out the third water channel outlet 82 to the water chamber 55, and into the outer portion 102 of the water chamber 55. The water passes from the outer portion 102 of the water chamber 55 to the outer air chamber 145 of the air chamber housing 59 through the third array of apertures 140. In the outer air chamber 145, the water mixes with air. Air is received into the outer air chamber 145 from the air intake 34, through the third air channel 90, through third air channel outlet 150, and into the outer air chamber 145. The mixed water and air can exit from the third array of nozzles 162 of the face plate 40 to provide a third jet spray mode hydrotherapy to the user. This third jet spray mode hydrotherapy can include more streams of water compared to the first and second jet spray modes, with each stream of water having a relatively smaller force compared to the stream(s) provided by the first and second jet spray mode.

In other embodiments, two water channels and two air channels are provided for two different jet spray modes. Or, four water channels and four air channels can be provided for four different jet spray modes. Any number of jet spray modes desired can be used, and the number of water channels and air channels needed to provide the desired number of jet spray modes can be used.

Figure 20:
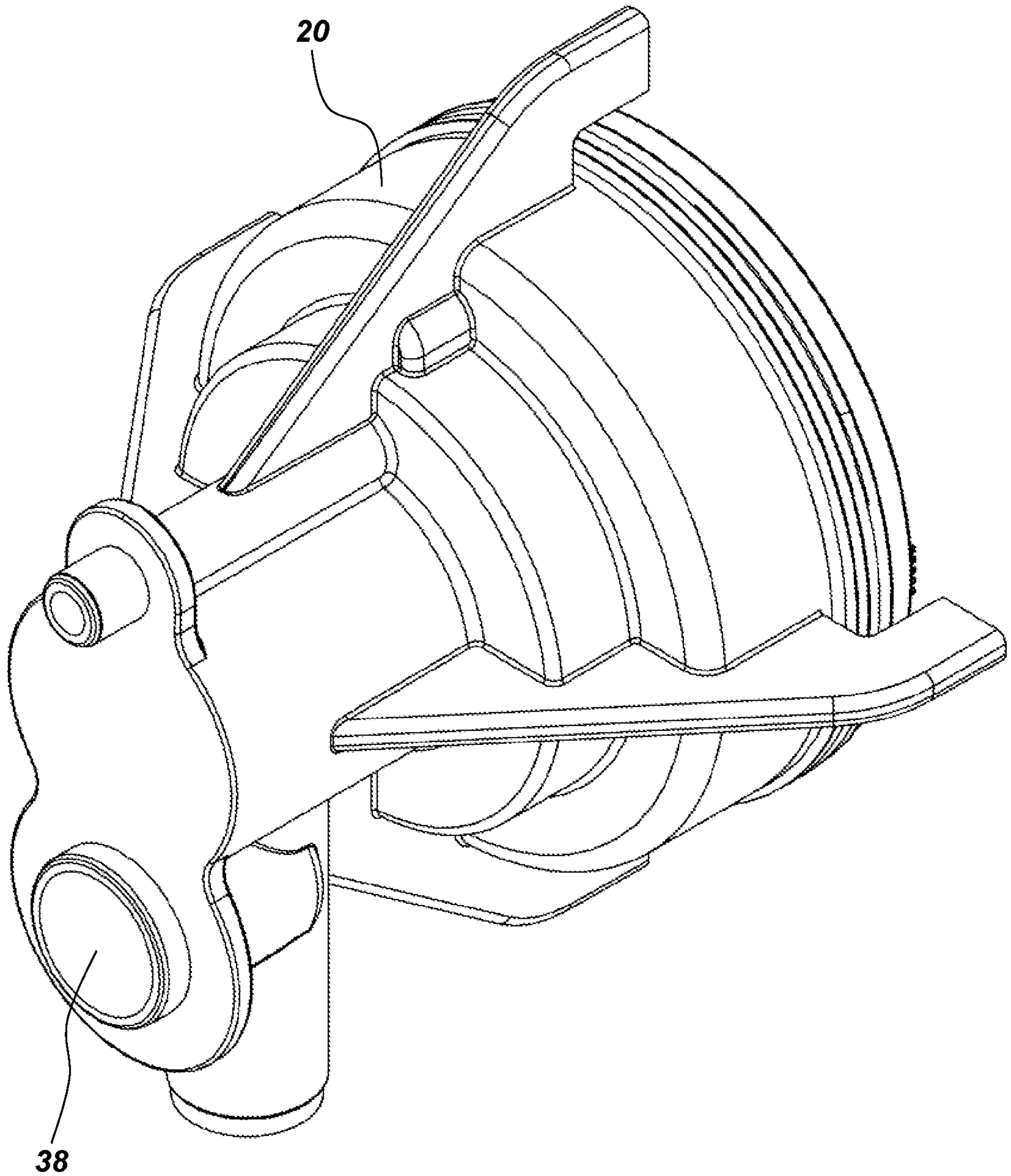
FIG. 20 is a rear perspective view of an embodiment of a jet system.
Figure 21:
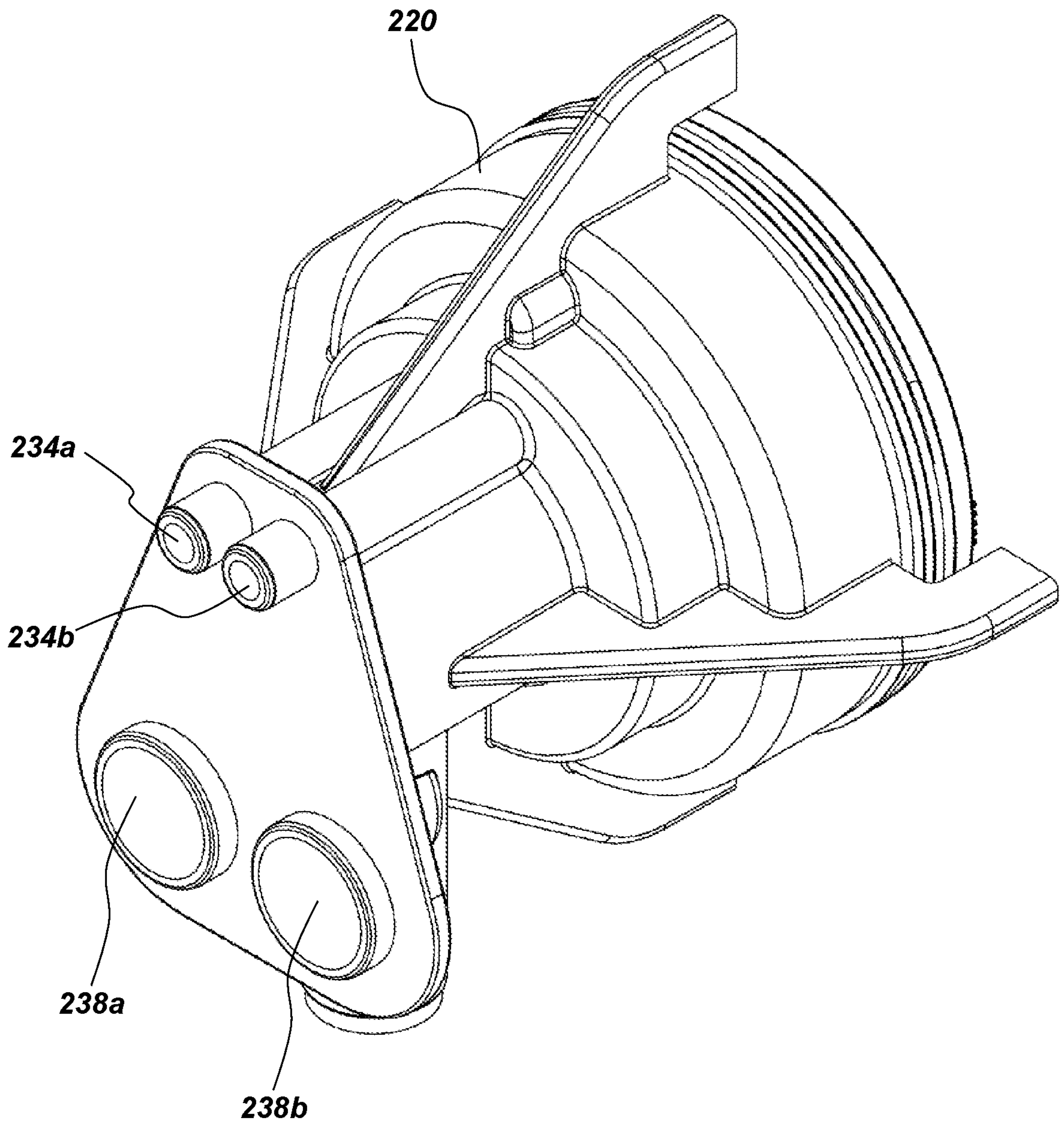
FIG. 21 is a rear perspective view of another embodiment of a jet system.

In other embodiments, the jet assembly includes multiple air inlets and multiple water inlets. For example, for a jet assembly with a first and second jet spray modes, a first air intake and a second air intake, and a first air inlet and a second air inlet, can be provided. Similarly, in other embodiments, the air and water pathways through the jet head can be arranged differently. For example, FIG. 20 shows a rear view of a housing 20 that includes a single water intake 38 and a single air intake 34. This housing 20 can be used with a valve that includes a plurality of water and air channels. In contrast, FIG. 21 shows a rear view of a housing 220 that includes a first water intake **238*a* and a second water intake 238*b*. The first water intake 238*a* can provide water to a first water channel, and the second water intake 238*b* can provide water to a second water channel. The housing 220 also includes a first air intake 234*a* and a second air intake 234*b*. The first air intake 234*a* can provide air to a first air channel and the second air intake 234*b*** can provide air to a second air channel. Providing multiple air intakes and multiple water intakes can similarly achieve a spray jet with a plurality of j et spray modes without the need for a valve to direct water and air flow from a single water intake and a single air intake.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular water-containing vessel (e.g., a spa); however, other vessels (e.g., pools, tubs, swim spas, etc.) are also contemplated. A spa is also known in the industry as a hot tub and is generally formed of a concave shell to receive and contain water. Structures, such as a jet, can extend through the concave shell to move water from a surface outside the spa to a surface inside the spa or shell. Surfaces inside the shell or inside the spa cavity are referred to as more "proximal" while surfaces that extend away from the spa cavity are referred to as "distal." A proximal side of a jet faces the spa shell where the user relaxes, and the jet can provide hydrotherapy to the user in the spa.

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A spa jet having more than one jet spray mode, the spa jet comprising:

a housing, the housing having a proximal end for placement in fluid communication with a spa cavity and a distal end, the distal end comprising an air intake and a water intake;

a selectively rotatable jet head in rotatable connection within the housing, the selectively rotatable jet head comprising a valve, the valve having a first water inlet, a second water inlet, and a third water inlet, the valve further comprising a first air channel, a second air channel, and a third air channel, and wherein the valve is rotatable from a first jet spray mode position in which the water intake is in fluid communication with the first water inlet and the air intake is in fluid communication with the first air channel, a second jet spray mode position in which the water intake is in fluid communication with the second water inlet and the air intake is in fluid communication with the second air channel, and a third jet spray mode position in which the water intake is in fluid communication with the third water inlet and the air intake is in fluid communication with the third air channel;

wherein the first water inlet is in fluid communication with a first water channel, the first water channel extending through the valve from the first water inlet to a first water channel outlet;

wherein the second water inlet is in fluid communication with a second water channel, the second water channel extending through the valve from the second water inlet to a second water channel outlet;

wherein the third water inlet is in fluid communication with a third water channel, the third water channel extending through the valve from the third water inlet to a third water channel outlet;

wherein the selectively rotatable jet head further comprises a water chamber in connection with the valve, the water chamber comprising:

a central portion for receiving a portion of the first water channel outlet;

a medial portion in fluid communication with the second water channel outlet; and an outer portion in fluid communication with the third water channel outlet;

wherein the selectively rotatable jet head further comprises an air chamber housing in connection with the water chamber, the air chamber housing having a proximal face, the proximal face comprising a first, center aperture, a first divider separating the first, center aperture from a second array of apertures and forming a central air chamber and a medial air chamber, and a second divider separating the second array of apertures from a third array of apertures and forming an outer air chamber;

the first, center aperture of the air chamber for receiving a portion of the first water channel;

wherein the second array of apertures are in fluid communication the medial portion of the water chamber and the second air channel to allow air and water to mix in the medial air chamber when the valve is in the second jet spray mode position;

wherein the third array of apertures are in fluid communication with the outer portion of the water chamber and the third air channel to allow air and water to mix in the outer air chamber when the valve is in the third jet spray mode position;

wherein the selectively rotatable jet head further comprises a face plate in connection with the air chamber, the face plate comprising:

a first nozzle in fluid communication with the first water channel;

an array of second nozzles in fluid communication with the second array of apertures of the medial air chamber; and an array of third nozzles in fluid communication with the third array of apertures of the outer air chamber.

2. The spa jet of claim 1, wherein the housing is for positioning through a void in a spa shell.

3. The spa jet of claim 1, wherein the housing is for positioning in a seat back that is selectively removable from a spa shell.

4. A spa jet having more than one jet spray mode, the spa jet comprising:

a selectively rotatable jet head, the selectively rotatable jet head having a first jet spray mode and a second jet spray mode a water chamber in connection with a valve, the water chamber comprising:

a central portion for receiving a portion of a first water channel outlet, a medial portion in fluid communication with a second water channel outlet, an outer portion in fluid communication with a third water channel outlet; and an air chamber housing in connection with the water chamber, the air chamber housing comprising a central air chamber, a medial air chamber with a second array of apertures, and an outer air chamber with a third array of apertures; and wherein the selectively rotatable jet head comprises the valve, the valve having a first water inlet and a second water inlet, the valve further comprising a first air channel and a second air channel, and wherein the valve is rotatable from a first jet spray mode position in which a water intake is in fluid communication with the first water inlet and an air intake is in fluid communication with the first air channel, and a second jet spray mode position in which the water intake is in fluid communication with the second water inlet and the air intake is in fluid communication with the second air channel, wherein the valve further comprises a third water inlet and a third air channel, and wherein the valve is rotatable to a third jet spray mode position in which the water intake is in fluid communication with the third water inlet and the air intake is in fluid communication with the third air channel, wherein the first water inlet is in fluid communication with a first water channel, the first water channel extending through the valve from the first water inlet to the first water channel outlet, wherein the second water inlet is in fluid communication with a second water channel, the second water channel extending through the valve from the second water inlet to the second water channel outlet, and wherein the third water inlet is in fluid communication with a third water channel, the third water channel extending through the valve from the third water inlet to the third water channel outlet.

5. The spa jet of claim 4, further comprising:

a face plate in connection with the valve, such that rotation of the face plate rotates the valve, the face plate comprising a first nozzle in fluid communication with the first water inlet and the first air channel and the face plate comprising a second nozzle in fluid communication with the second water inlet and the second air channel.

6. The spa jet of claim 5, wherein the second nozzle comprises a second array of nozzles.

7. The spa jet of claim 4, wherein a portion of the first water channel extends through the central air chamber.

8. The spa jet of claim 7, wherein the second array of apertures are in fluid communication the medial portion of the water chamber and the second air channel to allow air and water to mix in the medial air chamber when the valve is in the second jet spray mode position.

9. The spa jet of claim 8, wherein the third array of apertures are in fluid communication with the outer portion of the water chamber and the third air channel to allow air and water to mix in the outer air chamber when the valve is in the third jet spray mode position.

10. The spa jet of claim 9, further comprising a face plate in connection with the air chamber.

11. The spa jet of claim 10, wherein the face plate comprises a first nozzle in fluid communication with the first water channel.

12. The spa jet of claim 11, wherein the face plate comprises an array of second nozzles in fluid communication with the second array of apertures of the medial air chamber.

13. The spa jet of claim 12, wherein the face plate comprises an array of third nozzles in fluid communication with the third array of apertures of the outer air chamber.

14. The spa jet of claim 4, wherein the spay jet is receivable within a housing, the housing positionable within a spa.

15. The spa jet of claim 14, wherein the housing comprises a proximal end for placement in fluid communication with the spa and a distal end comprising the air intake and the water intake.

16. The spa jet of claim 14, wherein the housing is for positioning in a seat back that is selectively removable from the spa.

17. The spa jet of claim 16, wherein a first, center aperture of the air chamber is for receiving a portion of the first water channel.

18. The spa jet of claim 4, wherein the air chamber further comprises a first, center aperture, a first divider separating the first, center aperture from the second array of apertures and forming the central air chamber.

19. The spa jet of claim 4, wherein the air chamber further comprises a second divider separating the second array of apertures from the third array of apertures and forming the outer air chamber.

* * * * *